US011553396B2

(12) United States Patent
Matsuura

(10) Patent No.: US 11,553,396 B2
(45) Date of Patent: Jan. 10, 2023

(54) PATH SELECTION APPARATUS, PATH SELECTION METHOD AND PROGRAM

(71) Applicant: Nippon Telegraph and Telephone Corporation, Tokyo (JP)

(72) Inventor: Hiroshi Matsuura, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 240 days.

(21) Appl. No.: 16/966,753

(22) PCT Filed: Feb. 6, 2019

(86) PCT No.: PCT/JP2019/004220
§ 371 (c)(1),
(2) Date: Jul. 31, 2020

(87) PCT Pub. No.: WO2019/156114
PCT Pub. Date: Aug. 15, 2019

(65) Prior Publication Data
US 2020/0367133 A1 Nov. 19, 2020

(30) Foreign Application Priority Data

Feb. 8, 2018 (JP) .............................. JP2018-021370

(51) Int. Cl.
*H04W 40/04* (2009.01)
*H04W 4/38* (2018.01)
(Continued)

(52) U.S. Cl.
CPC ............ *H04W 40/04* (2013.01); *H04W 4/38* (2018.02); *H04W 40/34* (2013.01); *H04L 45/48* (2013.01); *H04W 40/22* (2013.01)

(58) Field of Classification Search
CPC ....... H04W 4/38; H04W 40/34; H04W 40/04; H04W 40/22; H04W 84/18; H04L 45/48; H04L 67/12; Y02D 30/70
See application file for complete search history.

(56) References Cited

U.S. PATENT DOCUMENTS

2009/0016239 A1  1/2009 Honjo
2018/0359142 A1* 12/2018 White, Jr. ............... H04L 67/34
(Continued)

FOREIGN PATENT DOCUMENTS

JP          2009-21654          1/2009

OTHER PUBLICATIONS

Matsuura et al., "Optimization Challenge: Maximizing Lifetime of a Data-Gathering Sensor Tree," 2016 IEICE Communication Society Conference, Sep. 20, 2016, 2 pages.
(Continued)

*Primary Examiner* — Oussama Roudani
(74) *Attorney, Agent, or Firm* — Fish & Richardson P.C.

(57) ABSTRACT

A path selection apparatus for selecting a path when storing sensor reports from lower nodes in a packet and transmitting the packet to an upper node in a sensor tree including a plurality of nodes includes a node movement unit that selects a first node holding a child node under the first node in the sensor tree, and moves a second node under the subtree with the first node as a vertex to a position under a third node not belonging to the subtree in the sensor tree when a movement of the second node to the position under the third node decreases a total number of packets to be transmitted and received in the sensor tree.

12 Claims, 12 Drawing Sheets

(51) Int. Cl.
  *H04W 40/34*    (2009.01)
  *H04W 40/22*    (2009.01)
  *H04L 45/48*    (2022.01)

(56) References Cited

U.S. PATENT DOCUMENTS

2019/0149416 A1* 5/2019 Grevers, Jr. ........ H04L 41/0856
                                                    370/254
2021/0250282 A1* 8/2021 Gresset ................ H04W 40/00
2021/0367878 A1* 11/2021 Ramanathan ........... H04L 45/02

OTHER PUBLICATIONS

Khuller et al., "Balancing minimum spanning trees and shortest-path trees," Proceedings of the Fourth Annual ACM-SIAM Symposium on Discrete Algorithms, 1993, 14:243-250.

Kuo et al., "On the Construction of Data Aggregation Tree with Minimum Energy Cost in Wireless Sensor Networks: NP—Completeness and Approximation Algorithms," IEEE Transactions on Computers, 2016, 65(10):3109-21.

Winter et al, "RPL: IPv6 Routing Protocol for Low-power and Lossy Networks," Internet Engineering Task Force (IETF), Mar. 25, 2012, 158 pages.

\* cited by examiner (1) ADJACENCY BETWEEN SENSORS (2) SHORTEST-PATH TREE EXAMPLE 1

(3) SHORTEST-PATH TREE EXAMPLE 2

(4) NON-SHORTEST-PATH TREE EXAMPLE

TREE USE ENERGY (mJ) PER COLLECTION CYCLE

NORMALIZATION (ENERGY USE AMOUNT OF SHORTEST-PATH TREE = 1)

PATH SELECTION APPARATUS, PATH SELECTION METHOD AND PROGRAM

CROSS-REFERENCE TO RELATED APPLICATIONS

This application is a National Stage application under 35 U.S.C. § 371 of International Application No. PCT/JP2019/004220, having an International Filing Date of Feb. 6, 2019, which claims priority to Japanese Application Serial No. 2018-021370, filed on Feb. 8, 2018. The disclosure of the prior application is considered part of the disclosure of this application, and is incorporated in its entirety into this application

TECHNICAL FIELD

The present invention relates to a path selection apparatus, a path selection method, and a program in a sensor tree configured of a plurality of nodes including a plurality of sensor nodes.

BACKGROUND ART

A routing protocol for low-power and lossy networks (RPL) protocol has been standardized as a technology allowing disposition of sensors at specific places, measurement of humidity, temperature, gas concentration, or the like of a target place using sensor nodes, collection of sensor reports thereof in a data collection tree, and notification of the sensor reports to a base station from a root sensor node to perform analysis or to collect information of a gas meter, an electrical meter, or the like periodically in the data collection tree (see, for example, Non-Patent Literature 1). The data collection tree is a collection of sensor nodes configured in a tree-like shape, and relay nodes located between the sensor nodes and serving to relay sensor reports, and is also referred to as a sensor tree.

Each sensor node on the data collection tree collects the required number of sensor reports from the sensor for each collection cycle together with sensor reports from all lower sensor nodes of the node in a tree into a packet, and transmits the packet to an upper sensor node of the tree. Because of data aggregation rate S, which is an upper limit for the number of sensor reports that can be stored in one packet, the number of packets to be transmitted by each sensor node/relay node is derived from S and the number of sensor reports that the sensor node/relay node needs to transmit.

Further, E(i), an energy use amount of the sensor node/relay node i (node i) in one data collection cycle, can be expressed by Equation 1 below:

$$E(i) = E_{Tx} \Box T_N(i) + E_{Rx} \Box R_N(i) \quad \text{(Equation 1)}$$

In Equation 1, $E_{Tx}$ denotes the amount of energy required for transmission of one sensor packet, $E_{Rx}$ denotes the amount of energy required for reception of one sensor packet, $T_N(i)$ denotes the number of transmitted packets required for one data collection cycle by node i, and $R_N(i)$ denotes the number of received packets required for one data collection cycle by node i. When the sensor report number for one data collection cycle created by node i itself is d(i) and a sum of the numbers of sensor reports of all lower nodes in the tree transferred by node i is d(below_i), $T_N(i)$ is expressed by Equations 2 and 3 below.

$$T_N(i) = (d(\text{below}\_i) + d(i))/S, (\text{when}(d(\text{below}\_i) + d(i))\%S = 0) \quad \text{(Equation 2)}$$

$$T_N(i) = (d(\text{below}\_i) + d(i))/S + 1, (\text{when}(d(\text{below}\_i) + d(i))\% S \ne 0) \quad \text{(Equation 3)}$$

In Equations 2 and 3, "/" indicates a quotient of division, and "%" indicates a remainder of the division. It can be seen from Equations 2 and 3 that there is a vacancy in a packet that is transmitted or received when the remainder is other than 0. Thus, it is conceivable that a decrease in packet vacancy in each link is also an effective means for a reduction in the number of packets.

A total energy use amount $E_{tree}$ in one data collection cycle of the entire tree T can be expressed by Equation 4 below because the total energy use amount $E_{tree}$ is a sum of energy use amounts of all tree nodes in one data collection cycle.

$$E_{tree} = \Sigma_{i \Box T} E(i) \quad \text{(Equation 4)}$$

In particular, in a sensor installed indoors, power to be used by each sensor is supplied from an AC adapter. However, in this case, it is necessary to reduce total power to be provided to the sensor as much as possible for the purpose of power reduction. Thus, a method for minimizing $E_{tree}$ expressed by Equation 4 has been considered (see Non-Patent Literature 2). In Non-Patent Literature 2, two problems are addressed. One of the problems is a Minimum Energy Cost Aggregation Tree (MECAT) problem. This problem is a problem of minimization of a total energy, which is used by a tree node (a node in a tree) in a wireless sensor network (WSN) in which there is no relay node used to transfer only sensor reports of lower sensor nodes in a tree without generating the sensor reports. The other problem is a MECAT with Relay Node (MECAT-RN) problem, which is a problem of minimization of a total energy, which is used by all tree nodes, including relay nodes, in the WSN.

In Equation 1 above, because $E_{Tx}$ and $E_{Rx}$ are fixed values, minimizing a sum of the numbers of packets transmitted or received on all links in the tree (adjacency that tree nodes use to transfer sensor reports) is equivalent to a MECAT problem and a MECAT-RN problem for a WSN in which there is no relay node and a WSN that includes relay nodes. In other words, the MECAT problem and the MECAT-RN problem are equivalent to Equation 5 below. Because $E_{Tx}$ and $E_{Rx}$ are fixed values, the MECAT problem and the MECAT-RN problem are equivalent to Equation 6.

[Math. 1]

$$\min_{T \in T(G)} \sum_{e \in E_T} (E_{Tx} + E_{Rx}) \left\lceil \frac{z(e)}{S} \right\rceil \quad \text{(Equation 5)}$$

[Math. 2]

$$\min_{T \in T(G)} \sum_{e \in E_T} \left\lceil \frac{z(e)}{S} \right\rceil \quad \text{(Equation 6)}$$

In Equations 5 and 6. G denotes the WSN, and T(G) denotes a tree set on G. Further, e denotes a link in a tree and z(e) denotes the number of sensor reports transmitted in one data reception cycle on e, and thus z(e)=d(below_i)+d(i) is satisfied when a transmission node on e is i.

FIG. 1 shows an example of the number of packets of links on a data collection tree. Here, the data aggregation rate S is 5. Further, node 0 also indicates a root node, and a circular shaped node beginning with N indicates a sensor node, and a triangle shaped node filled in black indicates a relay node. A number in parentheses in each node indicates the number d(i) of sensor reports generated from the node, and an adjacent underlined number indicates d(below_i). A solid arrow between nodes indicates a link in the tree, and a direction of the arrow indicates a transmission direction of a packet. A number besides the link in the tree indicates the number of packets that are transmitted on the link in one data collection cycle.

CITATION LIST

Non Patent Literature

Non-Patent Literature 1: T. Winter, et al., "RPL: IPv6 Routing Protocol for Low-power and Lossy Networks", RFC6550, IETF, March 2012.
Non-Patent Literature 2: Tung-Wei Kuo, Kate Ching-Ju Lin, and Ming-Jer Tsai, "On the Construction of Data Aggregation Tree with Minimum Energy Cost in Wireless Sensor Networks: NP-Completeness and Approximation Algorithms", IEEE Transactions on Computers, vol. 65, issue 10, pp. 3109-3121, 2016.
Non-Patent Literature 3: S. Khuller, B. Raghavachari, and N. Young. "Balancing minimum spanning trees and shortest-path trees", Algorithmica. vol. 14, pp. 305-321, 1995.

SUMMARY OF THE INVENTION

Technical Problem

Non-Patent Literature 2 demonstrates that a randomly created shortest-path tree is effective for an MECAT problem and, in the shortest-path tree, a total energy consumption of a sensor is curbed to be within twice an optimal solution (a minimum value of total energy consumption of all tree nodes). Here, the shortest-path tree is a tree in which each sensor node in the tree takes a minimum number of hops from a root node. For example, in (1) of FIG. 2, adjacency between nodes on the WSN is indicated by a dashed line. Here, the "adjacency" refers to a relationship in which communication (connection) is possible and, for example, refers to a relationship in which one node is present within a range that a radio wave signal (for example, a received signal strength indicator (RSSI)) from the other node reaches. A number in parentheses beside each node is the number of sensor reports that the node reports in one data collection cycle. Examples of the sensor tree created on the WSN are shown in (2) to (4).

(2) is an example of a shortest-path tree. A vertical relationship (link) between nodes in the tree is indicated by a solid arrow. Using this vertical relationship, a sensor report is transferred to node 0, which is a root node, along the tree. As shown in (2), all nodes in the tree are on a path with the smallest number of hops to node 0. (3) is also an example of the shortest-path tree. It can be seen that there are a plurality of shortest-path trees other than (2). (4) shows an example of a tree that is not the shortest-path tree. In this example, the number of hops in the tree from node 5 to node 0 is 3. However, the tree is not the shortest-path tree because the minimum number of hops is 2.

Non-Patent Literature 2 demonstrates that total energy of a sensor tree shown by Equation 6 is curbed to be within twice an optimal solution (minimum energy) in the case of a shortest-path tree regardless of the number of sensor reports reported by each node.

Further, Non-Patent Literature 2 describes that applying a light approximate shortest-path tree (LAST) algorithm (see Non-Patent Literature 3) is effective for the MECAT-RN problem. In the LAST algorithm, there are parameters α and β. In a tree created by (α,β)-LAST, it is assured that a distance of each node in a tree from a root node is within α times a shortest path from the root node, and a cost of the entire tree (a sum of tree link costs) is within β times a tree cost of a minimum spanning tree (MST). Non-Patent Literature 2 demonstrates that a tree created by applying (3,2)-LAST on a WSN including relay nodes is curbed to a total energy amount that is within seven times an optimal solution (a minimum energy tree).

FIG. 3 and FIG. 4 show examples of application of (3,2)-LAST to the MECAT-RN problem. (1) of FIG. 3 shows a WSN including relay nodes (RN: ▲). The relay node serves to relay between sensor nodes with no adjacency, and the relay node itself does not transmit a sensor report to root node 0. First, in (2), a logical link between sensor nodes that does not include a relay node is created. The logical link indicates a connection between the sensor nodes other than the relay nodes. In this case, each logical link cost is a minimum number of hops including the relay node between the sensor nodes. In (2), the logical link cost is a number marked beside each logical link, and all links with no adjacent marked number have link cost=3. (3) and (4) are the applications of a (3,2)-LAST algorithm. First, in (3), an MST is created in the network of (2). The MST is a tree with the smallest cost sum of logical links that constitute the tree over all the nodes (sensor nodes 0 to 5). A Prim algorithm or the like is used.

In (4), which is a characteristic of (3,2)-LAST, a comparison between the shortest path costs at each node on the MST is performed. When a condition of a path on the MST>(3*the shortest path from the root node) is satisfied, an MST path is replaced with the shortest path from the root node. In this example, it can be seen that a path from node 5 to node 2 on the MST is replaced with the shortest path. In (5), a result of developing the tree created as a result of the (3,2)-LAST algorithm in (4), including the relay nodes, is shown. When there is a plurality of paths from node 0 to a certain node as a result of (5), the shortest path among the paths is selected, but in the example of FIG. 3, the path is uniquely determined at each node.

In FIG. 4, a countermeasure when a plurality of paths are present for one node as a result of disassembly into relay nodes is shown. In this example of (2), similarly, a logical link between sensor nodes that does not include relay nodes is created. In (2), the logical link cost is a number marked beside each logical link, and all links with no adjacent marked number have link cost=2. In (3), an MST is created on the basis of the logical link set in (2). In this example, because there is no node that satisfies the condition of a path on the MST>(3*the shortest path from the root node), a result of (3) is developed in (4) as it is, including the relay nodes.

However, it can be seen that nodes 1 to 4 have two paths to root node 0. In this case, the shortest path is selected in order from node 1. The shortest path from node 1 reaches a node through relay node (r1), and thus a link between node 1 and node r2 is deleted. As a result, a path from each node to node 0 is uniquely determined and a final tree of (5) is generated.

In a known method, it has been demonstrated in Non-Patent Document 2 that an energy use amount within twice the optimal solution in the MECAT problem, and an energy use amount within seven times the optimal solution in the MECAT-RN problem are upper limits. However, there is concern that maximum use energy increases by up to twice in the MECAT problem and up to seven times in the MECAT-RN problem. A method for reducing an increment in use energy from these optimal solutions has not been proposed.

Further, for both the MECAT problem and the MECAT-RN problem, the known method does not change a tree configuration is not changed according to (d(below_i)+d(i)), which is the sensor report number transmitted by each sensor node.

The present invention has been made in view of the foregoing, and an object of the present invention is to reduce an energy use amount of nodes on a sensor tree by moving nodes of the sensor tree to change a configuration of the sensor tree.

Means for Solving the Problem

A path selection apparatus according to an aspect of the present invention is a path selection apparatus for selecting a path when storing sensor reports from lower nodes in a packet and transmitting the packet to an upper node in a sensor tree including a plurality of nodes including a plurality of sensor nodes, the path selection apparatus including: a node movement unit configured to select a first node holding a child node under the first node in the sensor tree, and move a second node under the subtree with the first node as a vertex to a position under a third node not belonging to the subtree in the sensor tree when a movement of the second node to the position under the third node decreases a total number of packets to be transmitted and received in the sensor tree.

Further, a path selection method according to an aspect of the present invention is a path selection method in a path selection apparatus for selecting a path when storing sensor reports from lower nodes in a packet and transmitting the packet to an upper node in a sensor tree including a plurality of nodes including a plurality of sensor nodes, the path selection method including: selecting a first node holding a child node under the first node in the sensor tree, and moving a second node under the subtree with the first node as a vertex to a position under a third node not belonging to the subtree when a movement of the second node to the position under the third node decreases a total number of packets to be transmitted and received in the sensor tree.

Further, a program according to an aspect of the present invention causes a computer to function as each unit of the path selection apparatus.

Effects of the Invention

According to the present invention, it is possible to reduce the energy use amount of the nodes on the sensor tree by moving the nodes of the sensor tree to change a configuration of the sensor tree.

DESCRIPTION OF EMBODIMENTS

Figure 5:
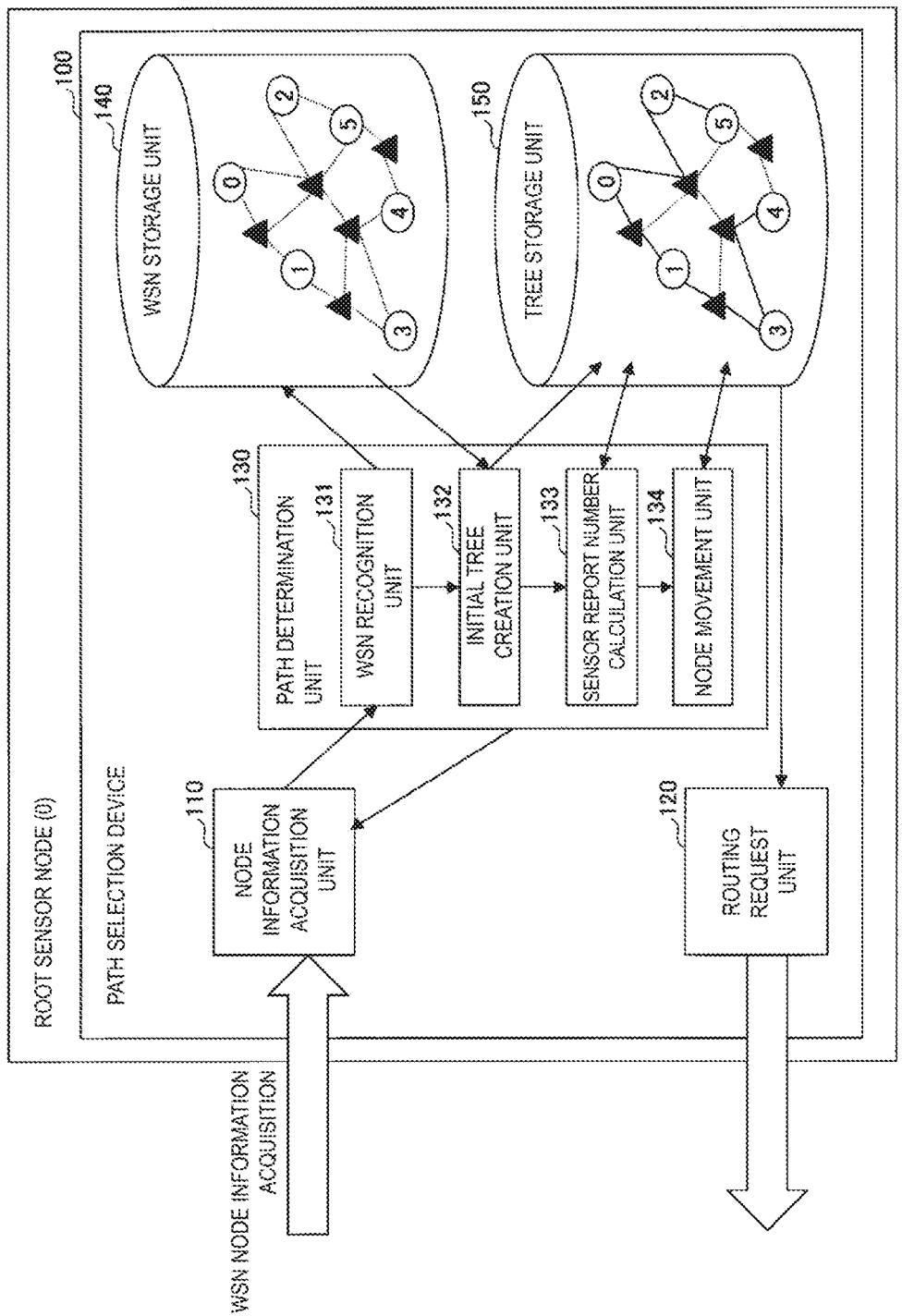
FIG. 5 is a diagram illustrating an example of a functional configuration of a path selection apparatus according to an embodiment of the present invention.

Hereinafter, embodiments of the present invention will be described with reference to the drawings. FIG. 5 shows an example of a functional configuration of a path selection apparatus 100 according to an embodiment of the present invention.

The embodiment of the present invention will be described by taking a network use form that repeats a data collection cycle in which a sensor report from a lower node is stored in a packet and transmitted to an upper node in a sensor tree including a plurality of nodes (sensor nodes/relay nodes). The embodiment of the present invention is applicable to a WSN in which there is no relay node, and can also be applied to WSN including relay nodes.

Figure 1:
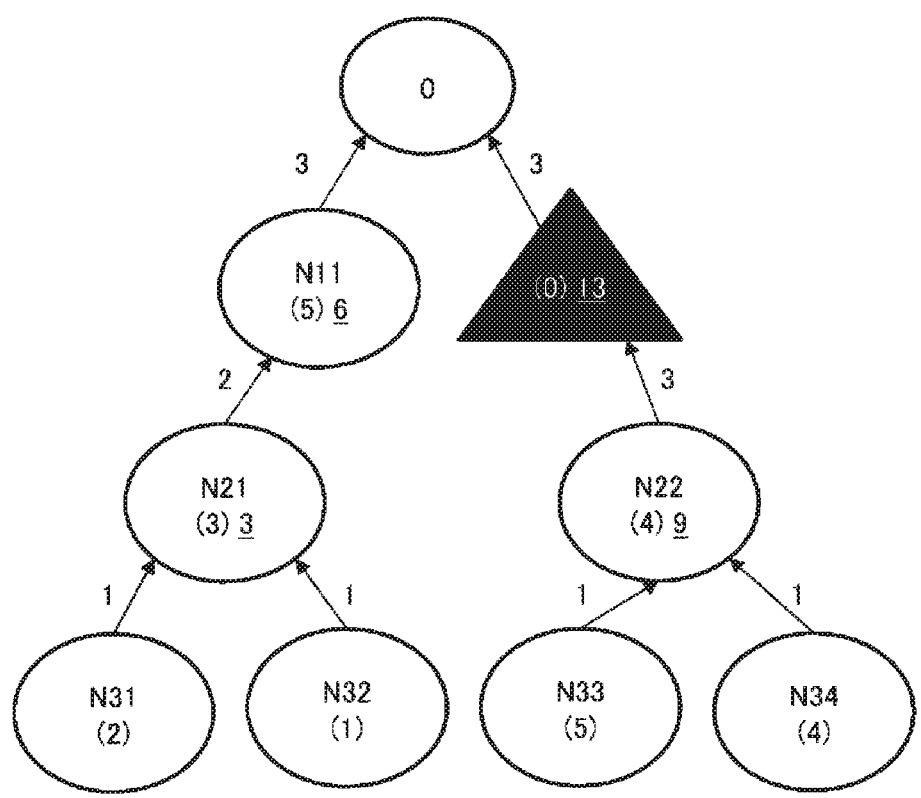
FIG. 1 is a diagram illustrating an example of the number of packets of links on a data collection tree.
Figure 2:
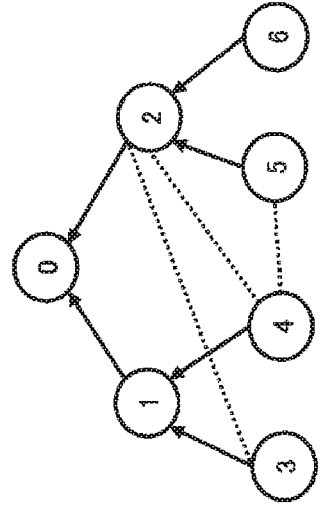
FIG. 2 is a diagram illustrating the shortest-path tree that is applied to an MECAT problem in a scheme of the related art.
Figure 2:
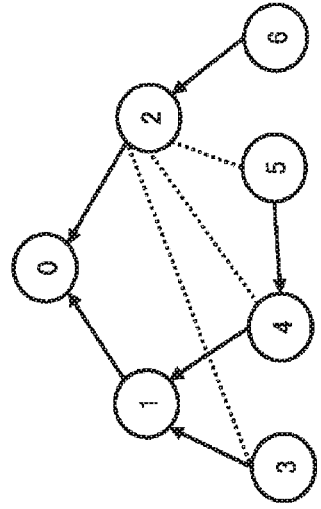
Figure 2:
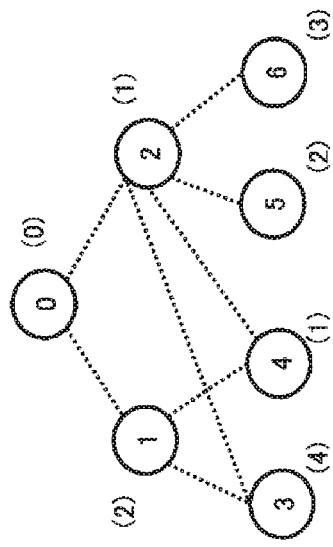
Figure 2:
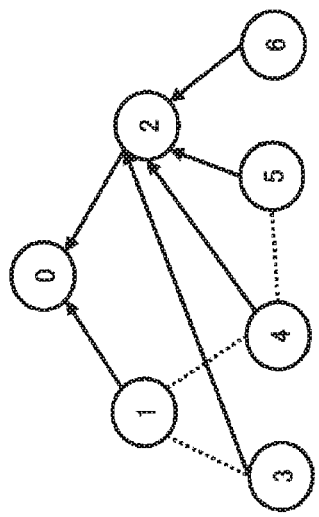
Figure 3:
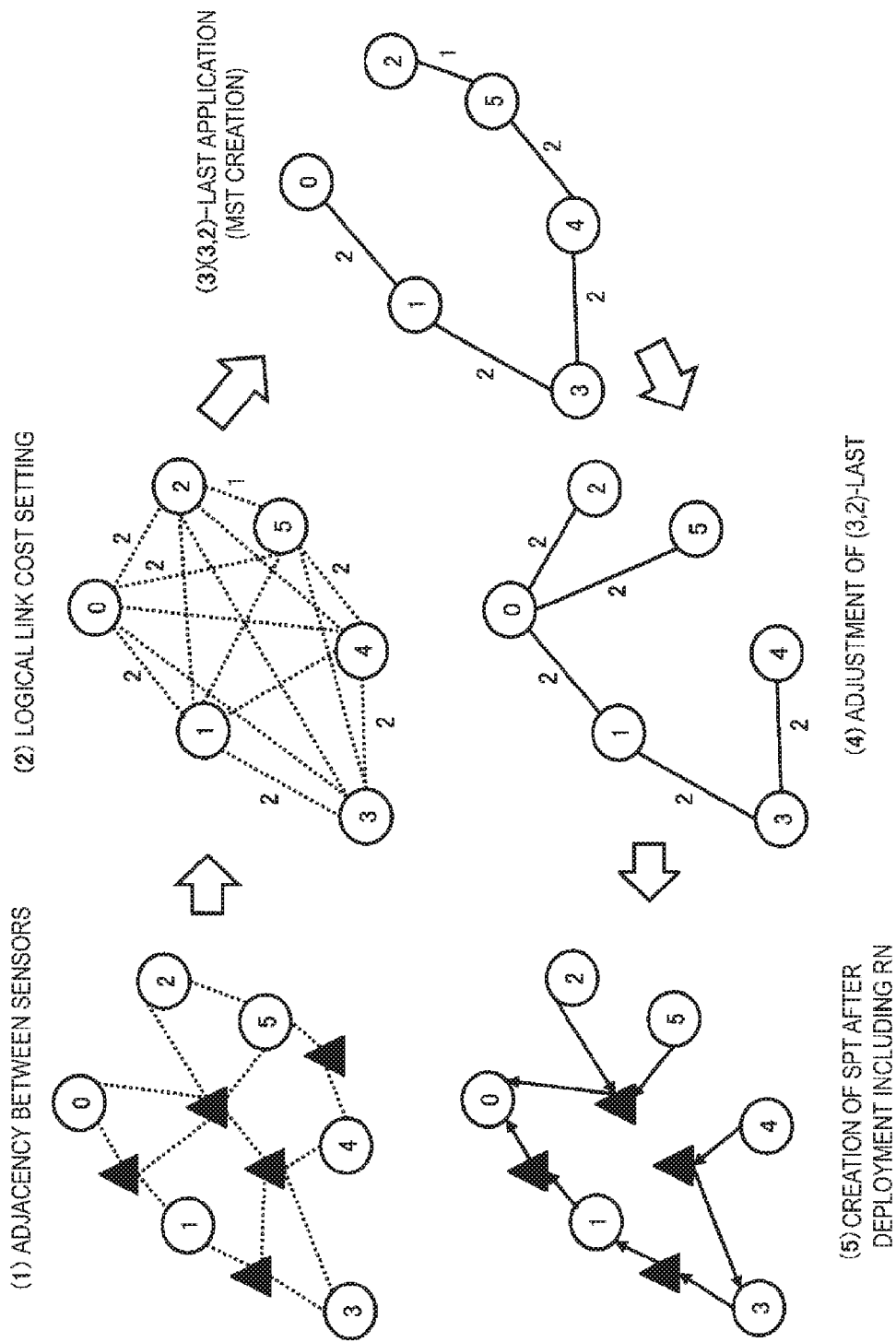
FIG. 3 is a diagram illustrating an example (1) of the application of a (3,2)-LAST algorithm to an MECAT-RN problem in a scheme of the related art.
Figure 4:
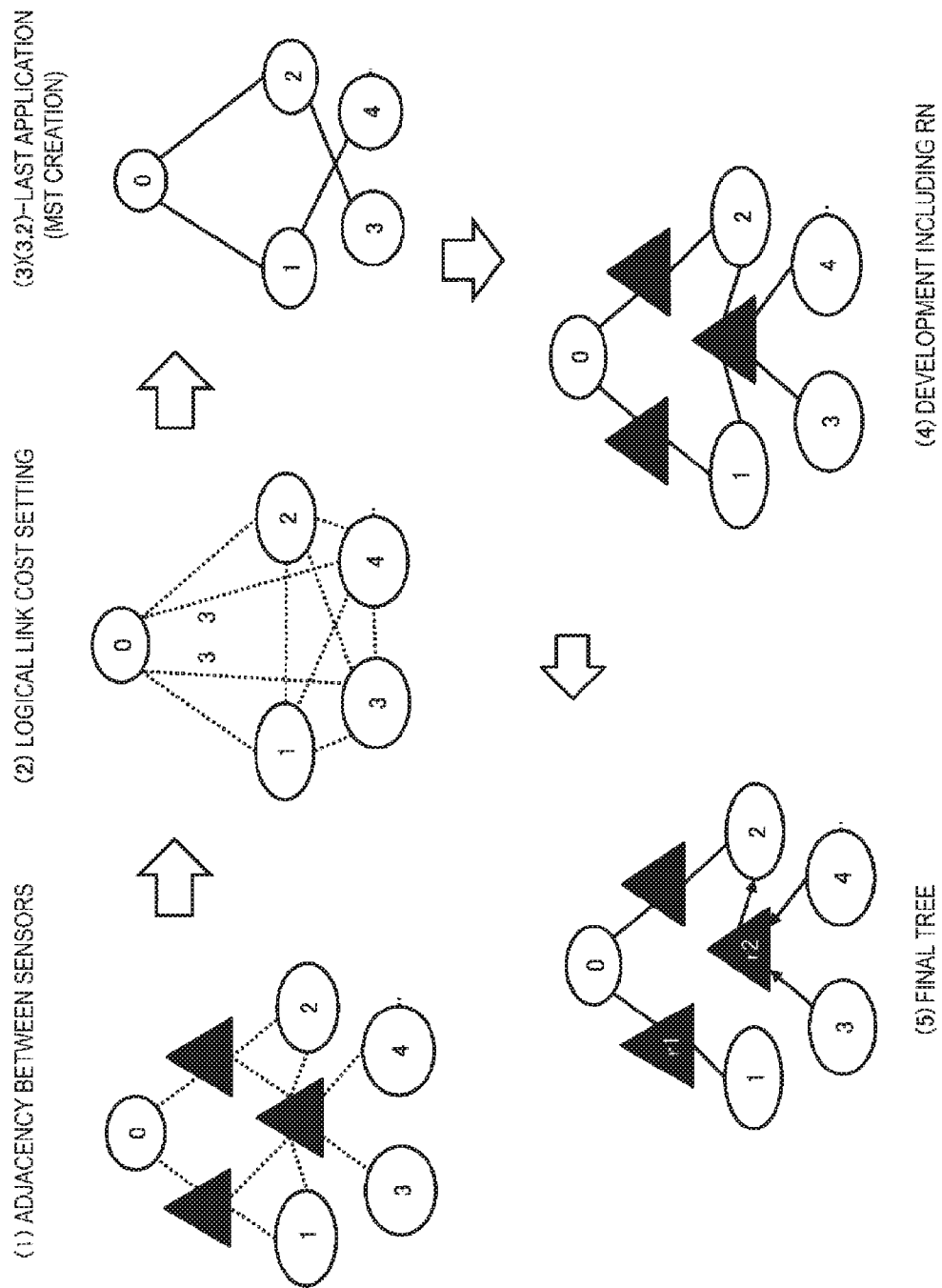
FIG. 4 is a diagram illustrating an example (2) of the application of a (3,2)-LAST algorithm to an MECAT-RN problem in a scheme of the related art.

As described above, in the MECAT problem for the WSN in which there is no relay node, the energy use amount is likely to increase to twice the optimal solution, and in the MECAT-RN problem for the WSN including relay nodes, the energy use amount is likely to increase to seven times the optimal solution. On the other hand, there is a difference in a report size of each node as can be seen in the example of FIG. 1, and in the case of a node with a greater report size, the smaller the number of links in the tree to the root node, the more energy can be saved. Further, because there is a vacancy in the packet to be transmitted or received when the remainder (d(below_i)+d(i))% S is other than 0, more energy can be saved as the number of sensor reports that fills in each packet becomes closer to S, which is the number of sensor reports that can be accommodated in each packet. In this regard, the path selection apparatus 100 selects a path on which nodes of the sensor tree can be moved for a reduction of an energy use amount.

The path selection apparatus 100 includes anode information acquisition unit 110, a routing request unit 120, a path determination unit 130, a WSN storage unit 140, and a tree storage unit 150, as shown in FIG. 5. The path determination unit 130 includes a WSN recognition unit 131, an initial tree creation unit 132, a sensor report number calculation unit 133, and a node movement unit 134. Although the path selection apparatus 100 is included in a root node (0) in this example, the path selection apparatus 100 does not necessarily need to be included in the root node. For example, the path selection apparatus 100 may be included in any sensor node/root or may be included in a device connected to the root node, such as a base station.

The node information acquisition unit 110 acquires information of the nodes adjacent to the root node, and acquires information of nodes adjacent to these nodes. Similarly, the acquisition of the information of the nodes is repeated, so that adjacency between all nodes belonging to the WSN to which the root node belongs can be acquired.

The WSN recognition unit 131 in the path determination unit 130 can recognize a configuration of the WSN from the adjacency between the nodes. As a result, the WSN configuration is stored in the WSN storage unit 140.

The initial tree creation unit 132 creates an initial tree. To create the initial tree, it is conceivable, as an example, that the shortest-path tree is used in the MECAT problem and the (3,2)-LAST algorithm is used in the MECAT-RN problem. The initial tree created in this manner is stored in the tree storage unit 150.

The sensor report number calculation unit 133 obtains a total sensor report number d(below_i) of the lower nodes transferred by each node i.

Figure 6:
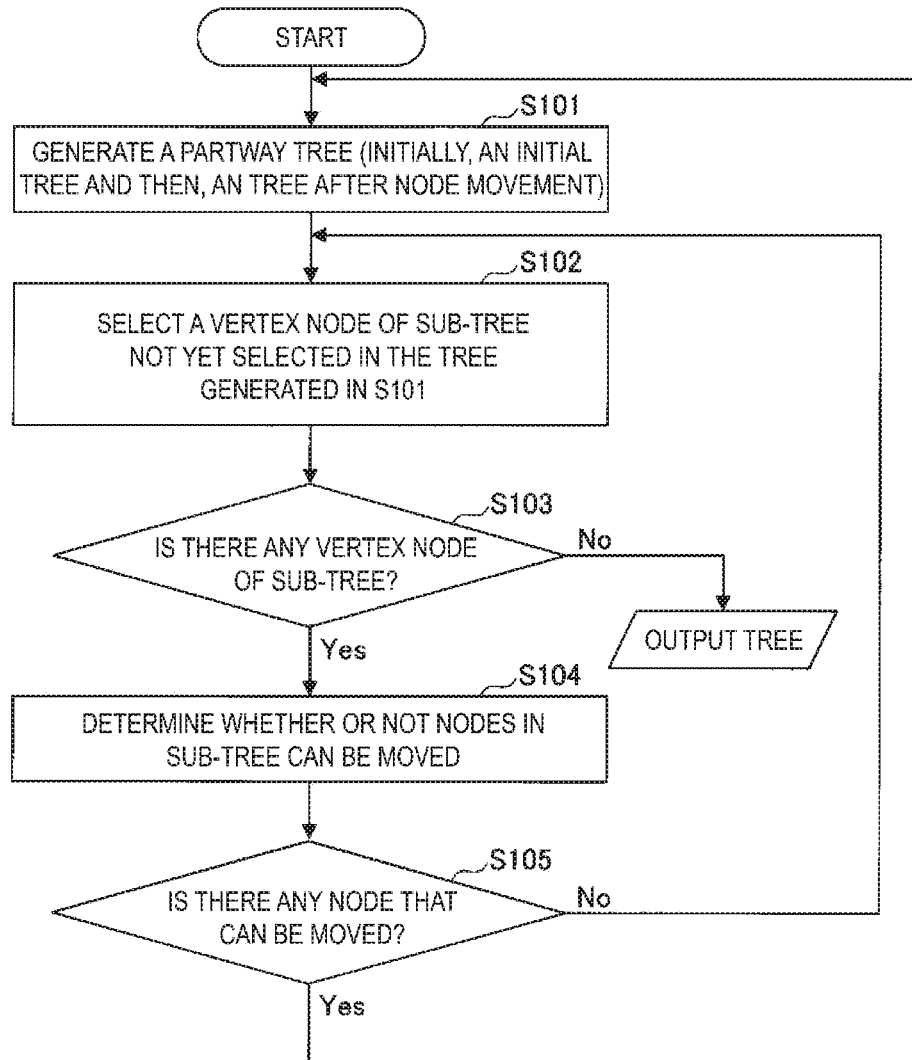
FIG. 6 is a flowchart illustrating operations of the path selection apparatus according to the embodiment of the present invention.

The node movement unit 134 moves the nodes of the sensor tree such that a total number of packets transmitted or received in the sensor tree is reduced, as described with reference to FIG. 6. The total number of packets is obtained from the sensor report number d(i) created by node i, the total sensor report number d(below_i) of the lower nodes transferred by the node i, and the data aggregation rate S when the sensor report is stored in the packet. When a total number of packets is decreased due to the movement of the nodes on the initial tree and, as a result, a tree in which a total energy consumption amount of nodes in the tree is curbed as compared with the initial tree is created, the node movement unit 134 stores the tree after the nodes have been moved, in the tree storage unit 150.

A finally generated tree configuration is reflected in the tree on the actual WSN by performing routing setting for each node from the routing request unit 120.

Next, a flowchart of FIG. 6 will be described. FIG. 6 is a flowchart illustrating an operations of the path selection apparatus 100 according to the embodiment of the present invention.

Step S101 is, initially, a process in which the initial tree creation unit 132 creates the initial tree. For example, in the case of the MECAT problem, the shortest-path tree is created, and in the case of the MECAT-RN problem, the initial tree is created in an existing manner such as (3,2)-LAST. A subsequent process is a process in which, when it is determined in step S105 below whether one node moves from a certain subtree to another subtree, the node movement unit 134 creates a tree after the nodes have moved. The sensor report number calculation unit 133 sets d(i), which is the report number created by each node i, and d(below_i), which is the total sensor report number of the lower nodes transferred by each node i, for the initial tree. Further, a tree after node movement is reset when there is a change in the total sensor report number d(below_i) of the lower nodes transferred by each node i.

Steps S102 to S105 described below are processes that are executed by the node movement unit 134.

In step S102, a vertex node of a movement target subtree in the tree generated in step S101 is determined. A condition in this case is that the vertex node is not a leaf node of the tree and has at least one child node. Further, after the tree is generated in step S101, anode that has not yet been selected in a loop of step S102 to S105 is selected.

In step S103, it is determined whether or not the vertex node of the subtree can be selected in step S102. When the vertex node cannot be selected (No), the tree created to that point in time becomes a final output tree, and the process ends. When the vertex node of the subtree can be selected, the process proceeds to step S104.

In step S104, it is determined whether or not there is anode (except for the vertex node) being under the vertex node of the subtree and having a decreased total number of packets transmitted or received in the tree due to the movement. A condition in this case is that a node that is a movement destination does not belong to the subtree.

In step S105, when there is anode that has been determined to have a packet reduction effect due to the movement in step S104 (Yes), the process proceeds to step S101 in which a movement to the destination node is performed and a tree after the movement is created. When it is determined that there is no packet reduction effect due to the movement under the subtree (No), the process proceeds to step S102 in which a vertex node of another subtree is searched for.

Figure 7:
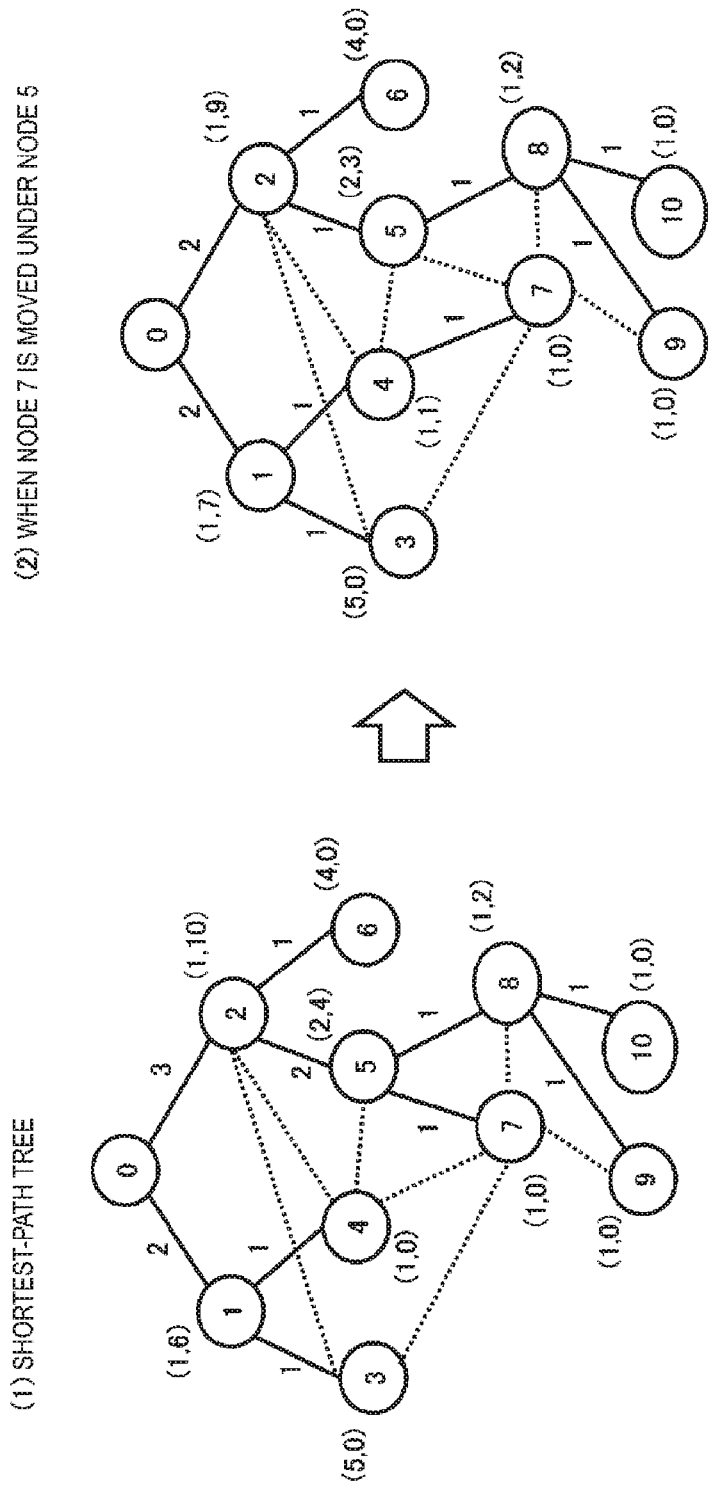
FIG. 7 is an example of a node movement when the embodiment is applied to the MECAT problem.

Example of Application to MECAT Problem FIG. 7 shows an example of a node movement when the embodiment has been applied to the MECAT problem. In this example, a shortest-path tree has already been formed, as in (1) of FIG. 7. In (a, b) marked beside each tree node in FIG. 7, a denotes d(i), which is a value of the sensor report number in one data collection cycle created by node i itself, and b denotes d(below_i), which is a sum of the sensor report numbers of all lower nodes transferred by the node i. Further, a number marked beside each link indicates the number of packets transmitted in the link, and the data aggregation rate S is 5.

As shown in this example, node 7 among nodes (node 7 to node 10) in the subtree with node 5 as the vertex is moved. Node 7 has adjacency with four nodes (node 3, node 4, node 8, and node 9) other than a link (7-5). However, node 8 and node 9 are not movement destination targets. This is because nodes 8 and 9 belong to a subtree with node 5 as a vertex, and there is no change in d(below_5), which is the sum of the sensor report numbers transmitted by the nodes under node 5, even at the time of the movement. Thus, the total number of packets in the tree when node 7 is moved to a position under node 3 is compared with the total number of packets in the tree when node 7 is moved a position under node 4, and a movement of node 7 to the position under the node in which the total number of packets is smaller is performed.

First, it can be seen that the number of packets is decreased by 1 in each of links (5-2) and (2-0) when node 7 is moved to the position under node 3. This is because the number of packets that node 5 transmits to node 2 is reduced from 2 to 1 in accordance with Equations 2 and 3, and the number of packets that node 2 transmits to node 0 is reduced from 3 to 2. Further, when node 7 is moved to the position under node 3, the number of packets that node 3 transmits to node 1 is increased by 1 and becomes 2, and there is no change in the number of packets that node 1 transmits to node 0 which remains at 2. Thus, the reduction in total number of packets is 1.

On the other hand, a result of moving node 7 under node 4 is shown in (2) of FIG. 7. It can be seen that in links (5-2) and (2-0), the number of packets is decreased by 1, as in the case in which node 7 is moved under node 3. However, it can be seen that there is no change in the number of transmitted packets in link (3-1) and link (1-0) before and after the movement of node 7. Thus, this reduction in total number of packets due to the movement becomes 2, the number of decreased packets is larger than the number of decreased packets of 1 when node 7 is moved to the position under node 3, and node 7 will move to the position under node 4. Thus, in a case in which a certain node has a plurality of neighboring nodes, and the movement to the subtree under any of the neighboring nodes decreases a total number of packets, the node moves to a position under the neighboring node in which the total number of packets is more decreased. As shown in the example of the movement in FIG. 7, the determination as to the number of decreased packets in the total number of packets will be made by examining only a path to the closest ancestor (node 0) that is common to node 5 and a parent (node 4), which is a movement destination. That is, only two paths (5-2-0) and (4-1-0) are sections in which the number of packets is changed due to this movement. While root node 0 is a common ancestor in this example, the closest common ancestor may be a node other than the root node.

Once the node is moved in this way, the vertex node of the subtree in the tree in (2) of FIG. 7 is then selected, the movement of the node is performed again when there is a movement leading to a decrease in the total number of packets in the subtree, and this is repeated until there is a tree in which there is no decrease in total number of packets due to the movement. However, for a node in which a value of d(below_i) has changed due to the movement, like the nodes on the paths (5-2-0) and (4-1-0), the value is updated to a new value each time the node is moved, as shown in (2) of FIG. 7.

Modification Example

Node i selected as the vertex node of the subtree may be a node in which a remainder obtained by dividing (d(below_i)+d(i)) by the data aggregation rate S is equal to or greater than 0 (that is, the remainder is equal to or greater than 1), as in (d(below_i)+d(i))% S≠0, like node 5 in (1) of FIG. 7. This is because a normally high packet accommodation rate when the remainder is 0 allows the movement of an underlying node to have little effect. Further, with such conditions, it is possible to shorten a processing time because the number of movement target nodes is reduced. That is, it is possible to reduce the number of routines in steps S102 to S105 of FIG. 6.

Further, for all the nodes under the selected node, a movement of the node in which the total number of packets is most decreased may be performed to obtain a change in total number of packets when the node is moved. In the example of FIG. 7, only the movement of node 7 is examined. However, there are nodes 7 to 10 the subtree under node 5, and thus a possibility of the movement of all the nodes is supposed to be examined. When the number of decreased packets is 3 or greater in the case of the movement, another node rather than the node 7 will be moved. This scheme often results in a great change in the configuration of the tree, and the total number of packets transmitted and received on the finally created tree is likely to be greatly decreased due to such a change. On the other hand, a processing load of step S104 in FIG. 6 is likely to be increased.

Further, an upper limit may be set for the number of times that a node such as node 5 in FIG. 7 is selected as the vertex of the subtree. For example, when the upper limit is five times and the node 5 has already been selected five times, the node 5 is not selected as the vertex node of the subtree. This prevents a particular node from being excessively selected as the vertex of the subtree, and provides an effect of a reduction in processing time. That is, it is possible to reduce the number of routines in steps S102 to S105 of FIG. 6.

Further, an upper limit may beset for the number of movements of each node. For example, when the upper limit number is five times and node 7 has already moved five times, node 7 will not be a movement target. This provides an effect that the concentration of movement to a certain node is avoided and a processing time can be reduced. Tat is, there is an effect that the processing load of step S104 in FIG. 6 can be reduced.

Example of Application to MECAT-RN Problem

Figure 8:
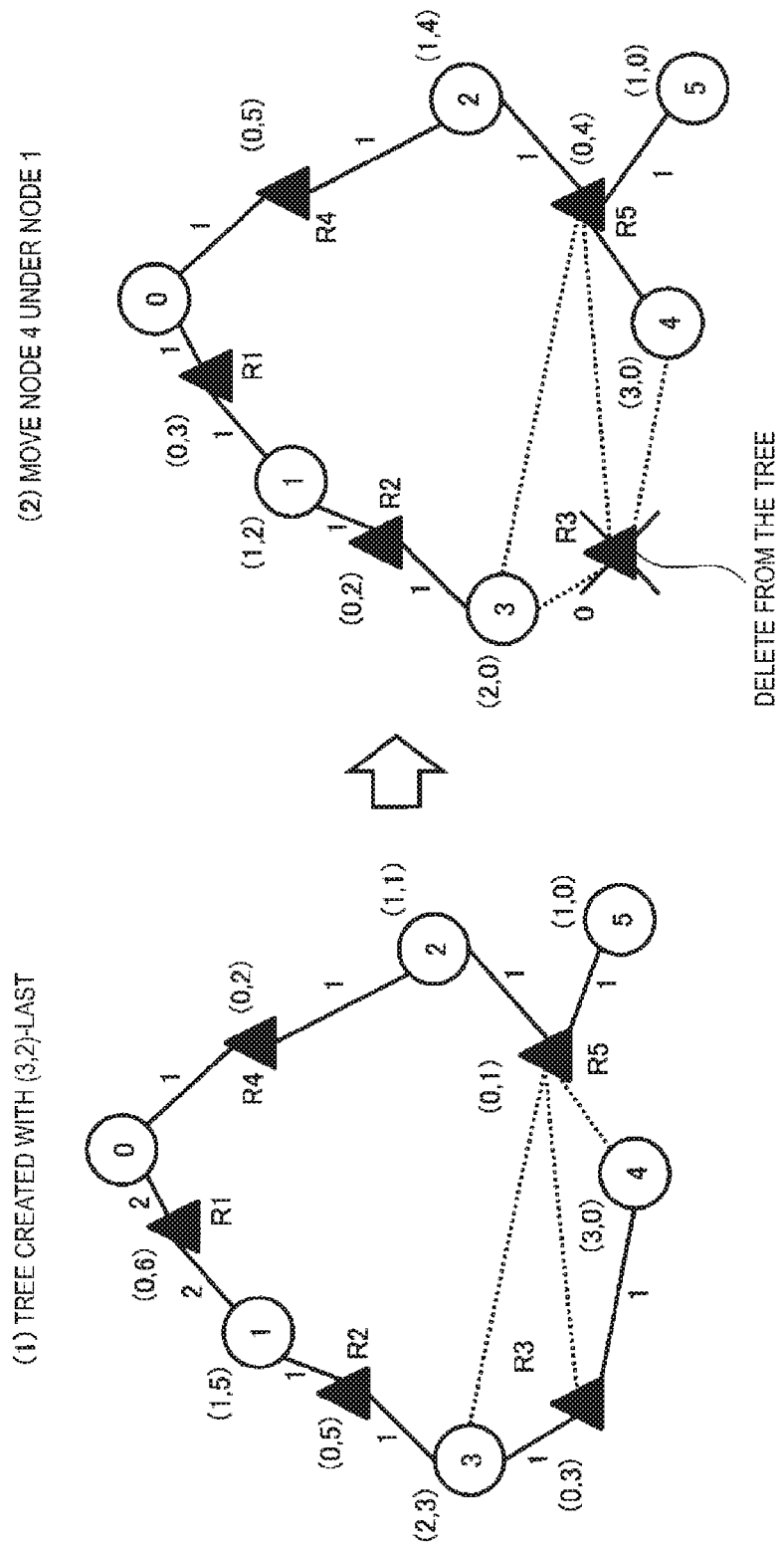
FIG. 8 is an example of a node movement when the embodiment is applied to the MECAT-RN problem.

FIG. 8 shows an example of a node movement when the embodiment has been applied to the MECAT-RN problem. In this example, a tree including a relay node has been already constructed by the (3,2)-LAST algorithm, as in (1) of FIG. 8. In FIG. 8, R1 to R5 indicate relay nodes and the other nodes 0 to 5 indicate sensor nodes. A solid line indicates adjacency between the tree nodes, and a sensor report is transferred from a lower node to an upper node and finally sent to root node 0 along this solid line. A dashed line indicates adjacency between nodes not used in the tree. Further, a number beside the link indicates the number of packets that are transmitted on the link, and the data aggregation rate S is 5.

In (1) of FIG. 8, node 1 is selected as a vertex node of a subtree. In the subtree, a node with the largest decrease in the total number of packets in the tree at the time of a movement among the nodes (node R2, node 3, node R3, and node 4) under node 1 is moved. In this case, among nodes under node 1, there are three nodes including node 3, node R3, and node 4 as nodes having adjacency with nodes other than the subtree. When node 3 is moved to a position under node R5, the number of packets is decreased by 1 in link (1-R1) and link (R1-0), whereas the number of packets is increased by 1 in link (R5-2), link (2-R4), and link (R4-0). Thus, the total number of packets will result in an increase of 1. This indicates that node 3 is not a movement target. It should be noted that the movement of node 3 to a position under node R5 only changes attribution of node 3 from node R2 to node R5, causing node R3 and node R4 to move to the subtree under node R5.

It can be seen that, when node R3 is moved under node R5, the number of packets is decreased by 1 in link (1-R1) and link (R1-0) and there is no link with an increased number of packets. However, it can be seen that a further reduction is obtained when node 4 is moved to a position under node R5. That is, the number of packets is decreased by 1 in link (1-R1) and link (R1-0), and the number of packets is decreased from 1 to 0 even in link (R3-3), resulting in a total reduction of 3 in the total number of packets. Thus, as a result, node 4 is moved to the position under node R5 as shown in (2) of FIG. 8.

However, a portion specific to the MECAT-RN problem is that the relay node needs to be deleted when the sensor node is ultimately not present under the relay node, like node R3 in (2) of FIG. 8. That is, this is because the relay node is present in order to relay sensor reports of the sensor node, and therefore, the relay node becomes unnecessary at a point in time when the sensor reports are no longer relayed.

All the modification examples in which the MECAT problem has been described can also be applied to the MECAT-RN problem when the relay node is added to the WSN.

Effects of Embodiments of the Invention

As described above, in the MECAT and the MECAT-RN problems, the initial tree is created in an existing manner such as the shortest-path tree or (3,2)-LAST, and then, the node is moved according to the embodiment. Thus, it is possible to further reduce a total energy amount that is used by the nodes of the sensor tree.

Further, an increase or decrease in the number of packets after the movement is accurately evaluated according to the remainder of the sensor report number of each node d(i), (d(below_i)+d(i))% S and then, the node is moved. This enables the tree configuration to be determined in consideration of these elements.

FIG. 9 to FIG. 12 show simulation results of an energy amount reduction effect and the processing load according to the embodiment.

In a computer simulation environment, 1000 sensor nodes were randomly disposed on a 400 m×400 m plane with the shortest distance interval between two different sensors being 10 m, and then, adjacency was created between sensor nodes within a transmission distance with a sensor signal transmission distance being 30 m. As a result, an adjacency of about 13.4 nodes per sensor node was created on average. In this environment, results of applying the embodiment to the initial tree after the shortest-path tree (the initial tree) was created in Breadth-first search are shown.

Figure 9A:
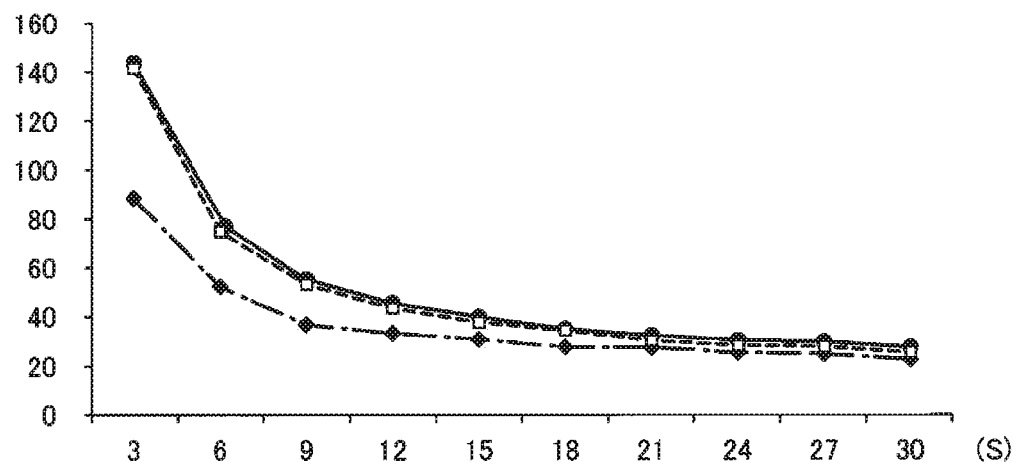
FIGS. 9A and 9B are diagrams illustrating an effect of reducing an energy use amount according to the embodiment of the present invention.
Figure 9B:
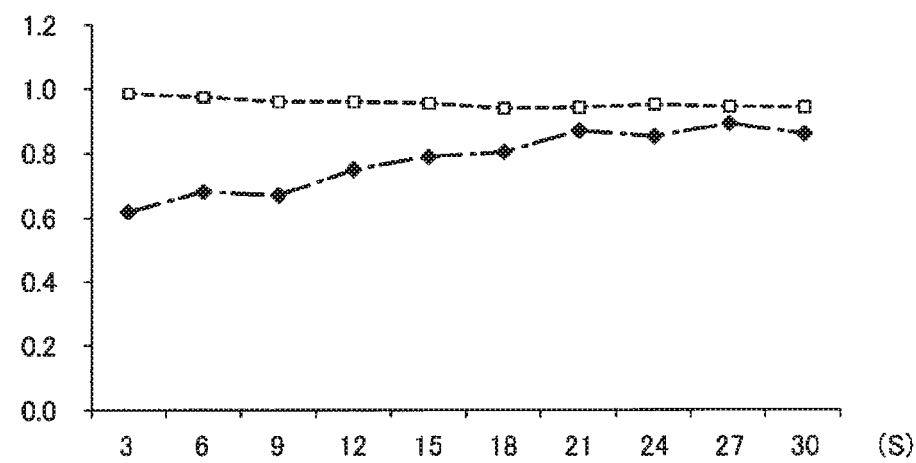

As evaluation conditions, a transmission energy of one sensor was 100 nJ/bit, a reception energy was 50 nJ/bit, one packet size was 16 bytes, and a sensor report number of each sensor was given a uniform random number of 1 to 5. FIG. 9A shows a difference between consumption energy of the shortest-path tree per data collection cycle and consumption energy of trees after the node has been moved according to the embodiment (method 1 and method 2). FIG. 9B shows a value obtained by normalizing each data aggregation rate (S) with the energy use amount of the shortest-path tree=1. In both graphs, a horizontal axis indicates the data aggregation rate (S). As a parameter of methods 1 and 2, only a subtree under a vertex node in which the remainder of (d(below_i)+d(i))% S is equal to or greater than 1 is a movement target. Further, in both method 1 and method 2, an upper limit of the number of times that a node is selected as the vertex node of the subtree is 10, and an upper limit of the number of movements of the node is 10. However, in method 1, a node with the largest packet reduction number under the subtree is not moved, but a node with the packet reduction effect of at least 1 is moved when the node is found under the subtree. In method 2, a movement of the node with the largest packet reduction number under the selected subtree is performed.

It can be seen from FIG. 9A that, when the data aggregation rate has a small value, an energy use amount of each tree increases, but clearly in the tree of method 2, energy is greatly reduced as compared with other two trees. It can be seen from FIG. 9B that, in method 2, energy of the shortest-path tree is greatly reduced at all S, as compared with method 1, but in particular, a decrease rate is high when S is small. In fact, method 1 obtains an energy reduction rate of 1 to 6% as compared with the shortest-path tree, whereas method 2 obtains a decrease rate of 11 to 38%. It can be seen from these facts that an effect of moving the node with the largest packet reduction number under the subtree is very high.

Figure 10A:
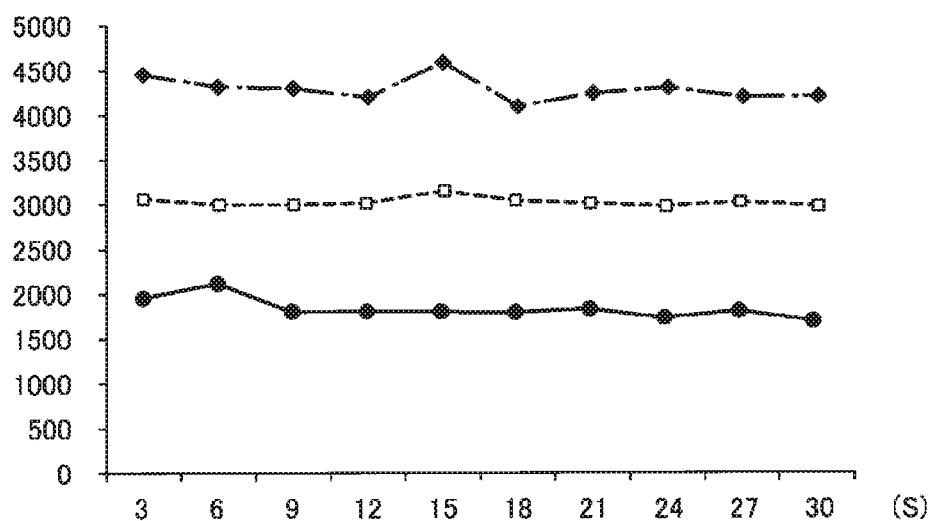
FIGS. 10A and 10B is a diagram illustrating results of evaluating a processing load according to the embodiment of the present invention.
Figure 10B:
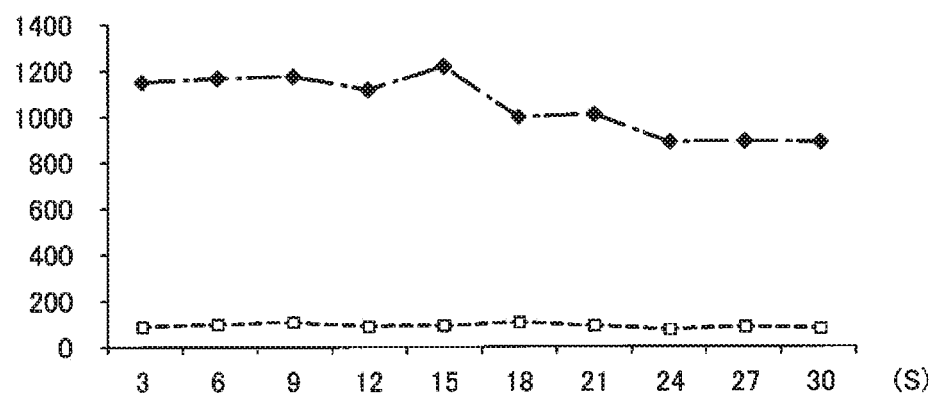

FIGS. 10A and 10B show results of evaluating a processing load according to the embodiment. FIG. 10A shows a generation time of the tree. In a network in which the number of nodes is 1000 and an average number of adjacent nodes is about 13.4 as in WSN, about two seconds are required for the creation of the shortest-path tree. Method 1 takes about 3 seconds including a tree creation time, and method 2 takes a tree creation time of 4 to 4.5 seconds. It is conceivable that an overhead of about 2 seconds will not be a great problem because the tree creation is usually not required to be real time and a frequency is not high.

It can be seen from FIG. 10B that the number of movements in method 2 is much larger than the number of movements in method 1. It can be seen from this result that the movement of the node with the largest packet reduction number under the subtree causes a great change in tree configuration, and also causes the number of times of the movement to increases. Further, it can be seen that a load at 1000 movements is approximately one second, and a load at one movement is small, as compared to FIG. 10A.

Figure 11A:
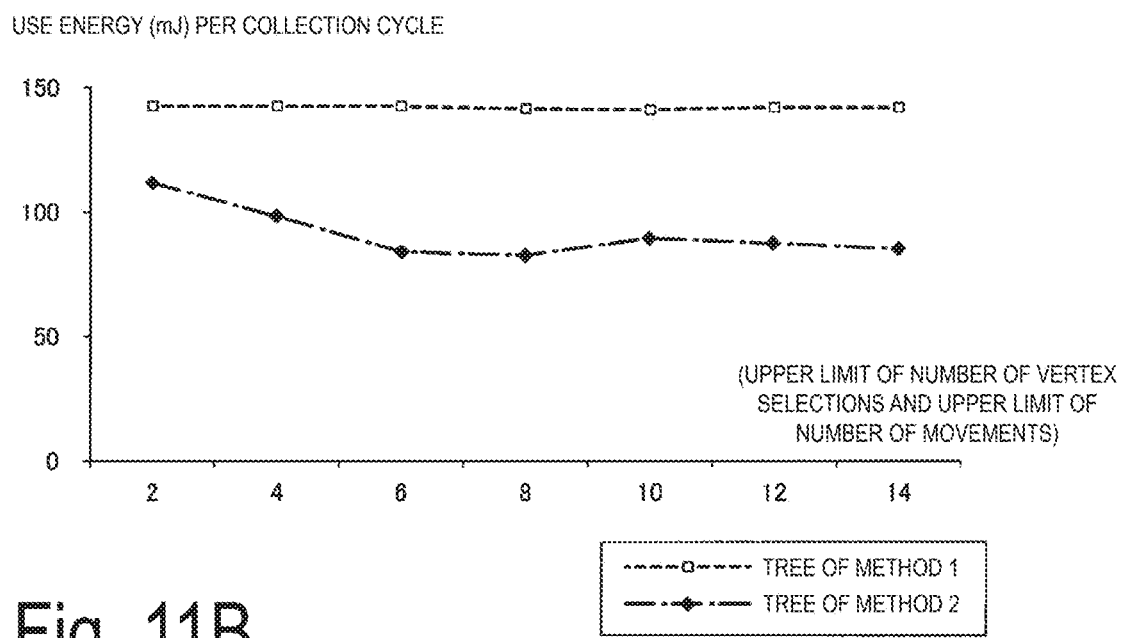
FIGS. 11A and 11B are diagrams illustrating evaluation results when an upper limit is set for the number of vertex selections and the number of movements.
Figure 11B:
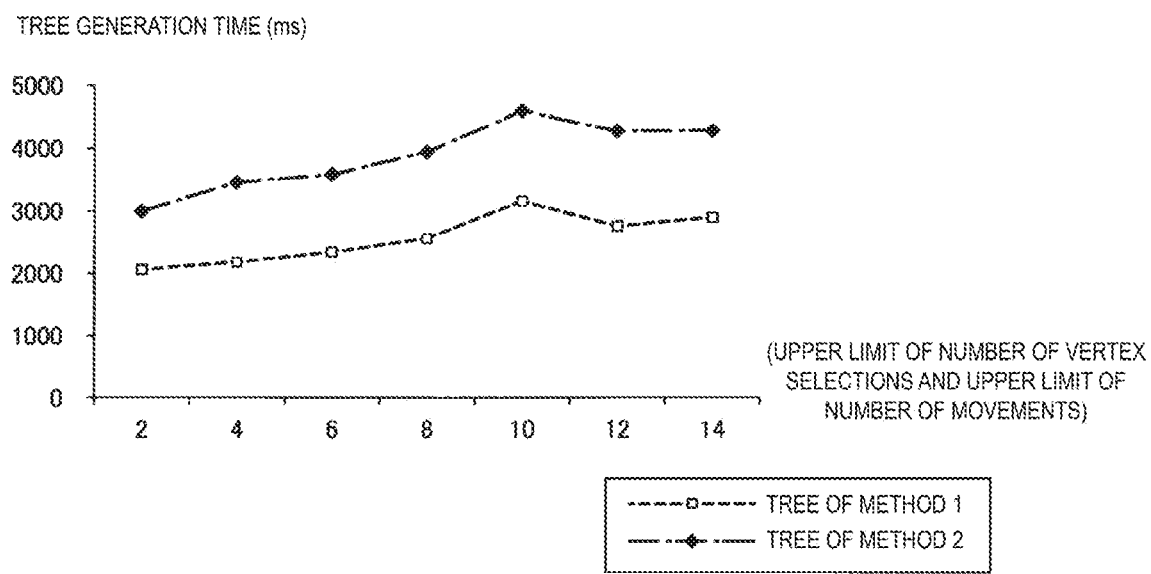

FIGS. 1A and 11B show evaluation results when an upper limit is set for the number of times the node is selected as a vertex of a subtree, and an upper limit is set for the number of movements of the node. Results of calculating the energy use amount in methods 1 and 2 by simultaneously changing theses upper limit values to 2 to 14 at intervals of 2 are shown in FIG. 11A, and a transition of a tree generation time is shown in FIG. 1B. For the data aggregation rate S, the following evaluation condition is set: S=3. It can be seen from FIG. 11A that there is no great difference in a degree of reduction in used energy when the two upper limit values are set to be equal to or greater than 6. That is, it can be seen that a maximum effect is obtained when these upper limit values are about 6. Further, it can be seen that in method 2, a tree can be generated in 4 seconds or less when the upper limit is 6, from the values shown in FIGS. 11B and 10A (a tree generation time 4 to 4.5 seconds in method 2). Further, it can also be seen that, by setting these upper limit values to about 6, a load can be reduced and a degree of energy reduction can also be maintained in some cases.

Example of Hardware Configuration

Figure 12:
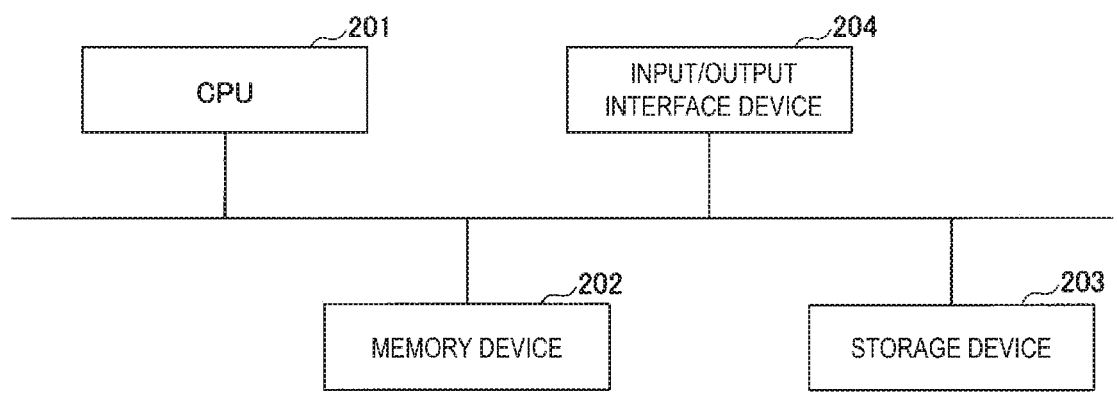
FIG. 12 is a diagram illustrating an example of a hardware configuration of the path selection apparatus according to an embodiment of the present invention.

FIG. 12 shows an example of a hardware configuration of the path selection apparatus 100 according to an embodiment of the present invention. The path selection apparatus 100 may be a computer including, for example, a processor such as central processing unit (CPU) 201, a memory device 202 such as a random access memory (RAM) or a read only memory (ROM), and a storage device 203 such as a hard disk. For example, functions and processes of the path selection apparatus 100 are realized by the CPU 201 executing data or a program stored in the storage device 203 or the memory device 202. Further, information required for the path selection apparatus 100 may be input from an input/output interface device 204, and results obtained in the path selection apparatus 100 may be output from the input/output interface device 204.

Supplement

Although the path selection apparatus according to the embodiment of the present invention has been described using the functional block diagram for convenience of description, the path selection apparatus according to the embodiment of the present invention may be realized by hardware, software, or a combination thereof. For example, embodiments of the present invention may be realized by a program for causing a computer to achieve the functions of the path selection apparatus according to the embodiments of the present invention, a program for causing a computer to execute the respective steps of the method according to the embodiments of the present invention, or the like. Further, respective functional units may be used in combination, as necessary. Further, the method according to the embodiment of the present invention may be performed in an order different from the order shown in the embodiments.

While the scheme for reducing the energy use amount of the node on the sensor tree has been described above, the present invention is not limited to the embodiments, and various changes and applications can be made within the scope of the claims.

REFERENCE SIGNS LIST

100 Path selection apparatus
110 Node information acquisition unit
120 Routing request unit
130 Path determination unit
131 WSN Recognition unit
132 Initial tree creation unit
133 Sensor report number calculation unit
134 Node movement unit
140 WSN Storage unit
150 Tree storage unit
201 CPU
202 Memory device
203 Storage device
204 Input/output interface device

The invention claimed is:

1. A path selection apparatus for selecting a path when transmitting a packet of sensor reports from lower nodes in a sensor tree to an upper node in the sensor tree, the path selection apparatus comprising:
a node movement unit, including one or more processors, configured to select a first node representing a vertex node of a subtree in the sensor tree and having a child node, move a second node positioned under the first node of the subtree in the sensor tree to a position under a third node not belonging to the subtree in the sensor tree when a movement of the second node to the position under the third node is determined to decrease a total number of packets to be transmitted and received in the sensor tree, and obtain, for each node positioned under the first node of the subtree in the sensor tree, a change in total number of packets when the respective node is moved, wherein the change in the total number of packets obtained for the second node represents a decrease in the total number of packets that is greater than that obtained for any other node positioned under the first node of the subtree in the sensor tree.

2. The path selection apparatus according to claim 1, wherein a value obtained for the first node is greater than or equal to one, the value being a remainder obtained by dividing (a) a sum of (i) a total number of sensor reports created by the first node and (ii) a total number of sensor reports of lower nodes transferred by the first node by (b) a rate at which sensor reports are aggregated into a packet.

3. The path selection apparatus according to claim 1, wherein the node movement unit is configured to set an upper limit for a number of times a same vertex node of a same subtree in the sensor tree is selected when node movements are repeatedly performed in the sensor tree.

4. The path selection apparatus according to claim 1, wherein the node movement unit sets an upper limit for a number of times a same node in the sensor tree is moved when node movements are repeatedly performed in the sensor tree.

5. A path selection method in a path selection apparatus for selecting a path when transmitting a packet of sensor reports from lower nodes in a sensor tree to an upper node in the sensor tree, the path selection method comprising:
selecting a first node representing a vertex node of a subtree in the sensor tree and having a child node; and
moving a second node positioned under the first node of the subtree in the sensor tree to a position under a third node not belonging to the subtree in the sensor tree when a movement of the second node to the position under the third node is determined to decrease a total number of packets to be transmitted and received in the sensor tree,
wherein a value obtained for the first node is greater than or equal to one, the value being a remainder obtained by dividing (a) a sum of (i) a total number of sensor reports created by the first node and (ii) a total number of sensor reports of lower nodes transferred by the first node by (b) a rate at which sensor reports are aggregated into a packet.

6. A non-transitory computer readable medium storing instructions that when executed by a computer to perform operations for selecting a path when transmitting a packet of sensor reports from lower nodes in a sensor tree to an upper node in the sensor tree, the operations comprising:
selecting a first node representing a vertex node of a subtree in the sensor tree and having a child node; and
moving a second node positioned under the first node of the subtree in the sensor tree to a position under a third node not belonging to the subtree in the sensor tree when a movement of the second node to the position under the third node is determined to decrease a total number of packets to be transmitted and received in the sensor tree,
wherein a value obtained for the first node is greater than or equal to one, the value being a remainder obtained by dividing (a) a sum of (i) a total number of sensor reports created by the first node and (ii) a total number of sensor reports of lower nodes transferred by the first node by (b) a rate at which sensor reports are aggregated into a packet.

7. The path selection method according to claim 5 further comprising:
obtaining, for each node positioned under the first node of the subtree in the sensor tree, a change in total number of packets when the respective node is moved, wherein the change in the total number of packets obtained for the second node represents a decrease in the total number of packets that is greater than that obtained for any other node positioned under the first node of the subtree in the sensor tree.

8. The path selection method according to claim 5 further comprising:
setting an upper limit for a number of times a same vertex node of a same subtree in the sensor tree is selected when node movements are repeatedly performed in the sensor tree.

9. The path selection method according to claim 5 further comprising: setting an upper limit for a number of times a same node in the sensor tree is moved when node movements are repeatedly performed in the sensor tree.

10. The non-transitory computer readable medium according to claim 6, wherein the operations further comprise:
obtaining, for each node positioned under the first node of the subtree in the sensor tree, a change in total number of packets when the respective node is moved, wherein the change in the total number of packets obtained for the second node represents a decrease in the total number of packets that is greater than that obtained for any other node positioned under the first node of the subtree in the sensor tree.

11. The non-transitory computer readable medium according to claim 6, wherein the operations further comprise:
    setting an upper limit for a number of times a same vertex node of a same subtree in the sensor tree is selected when node movements are repeatedly performed in the sensor tree.

12. The non-transitory computer readable medium according to claim 6, wherein the operations further comprise:
    setting an upper limit for a number of times a same node in the sensor tree is moved when node movements are repeatedly performed in the sensor tree.

* * * * *